(12) United States Patent
Chen et al.

(10) Patent No.: US 7,856,469 B2
(45) Date of Patent: Dec. 21, 2010

(54) SEARCHABLE INSTANT MESSAGING CHAT REPOSITORIES USING TOPIC AND IDENTIFIER METADATA

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 10/824,811

(22) Filed: Apr. 15, 2004

(65) Prior Publication Data

US 2005/0235034 A1    Oct. 20, 2005

(51) Int. Cl.
*G06F 15/16* (2006.01)
*G06F 3/00* (2006.01)

(52) U.S. Cl. .................. 709/204; 709/203; 709/206; 715/752

(58) Field of Classification Search .................. 709/204
See application file for complete search history.

(56) References Cited

U.S. PATENT DOCUMENTS

| | | | |
|---|---|---|---|
| 5,339,388 A | 8/1994 | Bates et al. | |
| 5,615,296 A * | 3/1997 | Stanford et al. | 704/270.1 |
| 6,076,100 A | 6/2000 | Cottrille et al. | 709/203 |
| 6,199,070 B1 | 3/2001 | Polo-Wood et al. | 707/202 |
| 6,301,609 B1 | 10/2001 | Aravamudan et al. | |
| 6,324,569 B1 | 11/2001 | Ogilvie et al. | 709/206 |
| 6,487,583 B1 | 11/2002 | Harvey et al. | |
| 6,532,218 B1 | 3/2003 | Shaffer et al. | |
| 6,587,127 B1 | 7/2003 | Leeke et al. | |
| 6,631,412 B1 | 10/2003 | Glasser et al. | 709/224 |
| 6,651,086 B1 | 11/2003 | Manber et al. | |

(Continued)

OTHER PUBLICATIONS

USPTO office action for U.S. Appl. No. 10/875,881 dated Sep. 26, 2008.

(Continued)

*Primary Examiner*—George C Neurauter, Jr.
*Assistant Examiner*—Kishin G Belani
(74) *Attorney, Agent, or Firm*—Yee & Associates, P.C.; William H. Steinberg; Rudolf O. Siegesmund

(57) ABSTRACT

A system and method for storing IM text in a repository where it can be searched by topic or participant based filters is disclosed. The repository may be a centralized database on the server side or it may be distributed in the client environment. The system comprises an IM Topic (IMT) program, an IM Filter (IMF) program, an IM save program (IMS), and an IM automatic alert (IMAL) program. The IMT program assigns topic tags to turns and topic shifts in the IM conversation. The IMF program searches the repository based on user selection of filters as well as full text search. There may be any number of topic tags. The IMS program automatically scans IM transcripts for topic tags and identifiers and saves transcripts or transcript segments that match pre-selected topic tags or identifiers to the repository. The IMAL program sends notifications and/or exports transcripts or transcript segments to pre-designated addresses when a match is made between a topic or identifier in a transcript and a pre-selected topic or identifier.

6 Claims, 8 Drawing Sheets

U.S. PATENT DOCUMENTS

| | | | |
|---|---|---|---|
| 6,757,365 B1 * | 6/2004 | Bogard | 379/88.17 |
| 6,760,749 B1 | 7/2004 | Dunlap et al. | |
| 7,034,691 B1 * | 4/2006 | Rapaport et al. | 340/573.1 |
| 7,080,139 B1 * | 7/2006 | Briggs et al. | 709/224 |
| 7,111,044 B2 | 9/2006 | Lee | |
| 7,177,817 B1 * | 2/2007 | Khosla et al. | 704/275 |
| 7,188,143 B2 | 3/2007 | Szeto | |
| 7,191,400 B1 | 3/2007 | Buvac et al. | |
| 7,263,526 B1 | 8/2007 | Busey et al. | |
| 7,269,794 B2 | 9/2007 | Martinez et al. | |
| 7,328,214 B2 | 2/2008 | Yuan et al. | |
| 7,596,596 B2 | 9/2009 | Chen et al. | |
| 2002/0035605 A1 | 3/2002 | McDowell et al. | |
| 2002/0059566 A1 * | 5/2002 | Delcambre et al. | 717/146 |
| 2002/0062347 A1 | 5/2002 | Low et al. | |
| 2002/0069249 A1 | 6/2002 | Pedersen | |
| 2002/0112004 A1 | 8/2002 | Reid et al. | |
| 2002/0120939 A1 | 8/2002 | Wall et al. | |
| 2002/0178163 A1 | 11/2002 | Mayer | |
| 2002/0188777 A1 * | 12/2002 | Kraft et al. | 710/100 |
| 2003/0014488 A1 | 1/2003 | Dalal et al. | |
| 2003/0023684 A1 * | 1/2003 | Brown et al. | 709/204 |
| 2003/0034999 A1 | 2/2003 | Coughlin et al. | |
| 2003/0208639 A1 | 11/2003 | Stern et al. | |
| 2003/0229722 A1 | 12/2003 | Beyda | |
| 2003/0233420 A1 * | 12/2003 | Stark et al. | 709/206 |
| 2004/0002049 A1 | 1/2004 | Beavers et al. | |
| 2004/0037406 A1 | 2/2004 | Gourraud | |
| 2004/0127241 A1 | 7/2004 | Shostak | |
| 2004/0174863 A1 | 9/2004 | Caspi et al. | |
| 2004/0174896 A1 | 9/2004 | Caspi et al. | |
| 2004/0174905 A1 | 9/2004 | Caspi et al. | |
| 2004/0175096 A1 | 9/2004 | Caspi et al. | |
| 2004/0175097 A1 | 9/2004 | Caspi et al. | |
| 2004/0177371 A1 | 9/2004 | Caspi et al. | |
| 2004/0177375 A1 | 9/2004 | Caspi et al. | |
| 2004/0177376 A1 | 9/2004 | Caspi et al. | |
| 2004/0215731 A1 | 10/2004 | Tzann-en Szeto | |
| 2004/0224772 A1 | 11/2004 | Canessa et al. | |
| 2004/0243922 A1 | 12/2004 | Sirota et al. | |
| 2004/0249650 A1 * | 12/2004 | Freedman et al. | 705/1 |
| 2004/0260710 A1 * | 12/2004 | Marston et al. | 707/100 |
| 2005/0021624 A1 * | 1/2005 | Herf et al. | 709/204 |
| 2005/0024387 A1 | 2/2005 | Ratnakar et al. | |
| 2005/0034079 A1 | 2/2005 | Gunasekar et al. | |
| 2005/0037739 A1 * | 2/2005 | Zhong | 455/413 |
| 2005/0097470 A1 | 5/2005 | Dias et al. | |
| 2005/0102361 A1 | 5/2005 | Winjum et al. | |
| 2005/0108332 A1 | 5/2005 | Vaschillo et al. | |
| 2005/0164154 A1 * | 7/2005 | Solomon | 434/350 |
| 2005/0234883 A1 | 10/2005 | Szeto et al. | |
| 2005/0234885 A1 | 10/2005 | Szeto et al. | |
| 2005/0262199 A1 | 11/2005 | Chen et al. | |
| 2005/0289220 A1 | 12/2005 | Chen et al. | |
| 2006/0004702 A1 * | 1/2006 | St. John et al. | 707/2 |
| 2006/0041828 A1 | 2/2006 | King et al. | |
| 2006/0047635 A1 | 3/2006 | Kraenzel et al. | |
| 2006/0074727 A1 * | 4/2006 | Briere | 705/8 |
| 2006/0161631 A1 | 7/2006 | Lira | |
| 2006/0161852 A1 | 7/2006 | Chen et al. | |
| 2006/0167994 A1 | 7/2006 | Chen et al. | |
| 2006/0277474 A1 * | 12/2006 | Robarts et al. | 715/745 |
| 2007/0027954 A1 | 2/2007 | Chen et al. | |
| 2009/0019377 A1 | 1/2009 | Chen et al. | |
| 2009/0030984 A1 | 1/2009 | Chen et al. | |

OTHER PUBLICATIONS

USPTO Notice of allowance for U.S. Appl. No. 10/875,881 dated Dec. 31, 2008.

USPTO office action for U.S. Appl. No. 11/039,508 dated Dec. 1, 2008.

USPTO office action for U.S. Appl. No. 11/039,508 dated May 11, 2008.

USPTO office action for U.S. Appl. No. 11/032,884 dated Dec. 2, 2008.

USPTO office action for U.S. Appl. No. 11/032,884 dated Apr. 3, 2009.

USPTO office action for U.S. Appl. No. 11/039,508 dated May 26, 2010.

USPTO office action for U.S. Appl. No. 12/177,277 dated May 28, 2010.

USPTO office action for U.S. Appl. No. 12/177,270 dated May 21, 2010.

* cited by examiner

SEARCHABLE INSTANT MESSAGING CHAT REPOSITORIES USING TOPIC AND IDENTIFIER METADATA

CROSS-REFERENCE TO RELATED APPLICATION

None

FIELD OF THE INVENTION

The present invention relates generally to Instant Messaging, and specifically to storing structured "chats" in a filtered, searchable repository on either a client computer, a server computer or both the client computer and the server computer.

BACKGROUND OF THE INVENTION

Instant Messaging (IM) is a communication service that allows a user on one computer to send and receive text messages in real time with another user on a second computer connected to the first computer by the Internet or other distributed communications protocol. In one version of instant messaging, the channel for this communication is often referred to metaphorically as a chat room, and the communication over the channel is referred to as chat. In another version, two or more users engage in an instant messaging conversation outside the boundaries of a chat room; each user is able to view a chat transcript on one or more local machines. Each user has a list of other users with whom they may want to chat. The IM service may alert the user when another user, who is on the user's participant list, is also online. A chat may then be started, and once started, either user can enter text that will appear on other user's displays.

IM is offered by most network and online service providers. In the workplace, IM conversations often take place between people working on common projects. In engineering and computer design activities it is not uncommon for one user to have ten or more multiple chats running simultaneously. Chats may describe simple information shared by two workers scheduling a meeting, or chats may contain complex discussions regarding proprietary information and critical decisions to keep a project moving forward. Chats may contain a high degree of historical data and proprietary knowledge that is useful not only to the participants but that may be useful to other workers within the organization who did not participate in the chat. Moreover, the knowledge and data captured in the chat transcript may be useful as historical data for future reference by the participants as well as others. Finally, in some areas, such as financial services, preservation of the chat transcript may be required by securities regulations. Therefore, it is important for organizations to preserve information captured in chat transcripts so that both the participants and the organizations can use the knowledge, information, and decisions contained in these IM conversations.

The prior art discloses both monitoring of chats as well as common repositories for chat transcripts. Monitoring of chats is disclosed in two United States patents. U.S. Pat. No. 6,631,412 to Glasser et al. discloses a system for monitoring user activity in an instant messaging session if the user has actively entered data during a first time interval. A message processor forms one or more data packets for transmission on the network such as user-entered data, and user activity messages. A user activity monitor measures the time period since the last user activity. U.S. Pat. No. 6,076,100 to Cottrille et al. discloses a method for monitoring chat room conversations including a database for storing penalty information corresponding to the identity of chat users.

The commercial prior art discloses methods to save IM conversations on both the server side and the client side. On the server side, users can save their IM messages in a common repository. Examples of applications having common repositories are FACETIME, IMLOGIC, MESSAGERITE, and IRON MOUNTAIN. These IM services provide archiving services so that financial services firms can demonstrate compliance with securities regulations. These solutions log only a limited number of end users in high-risk job roles. The financial services archiving, for example, applies only to particular groups in specific job roles. On the client side, ICQ provides a client-side repository. ICQ provides the ability to play back a chat session, both for the user and for new chat participants. But the ICQ repository is local, not distributed. The ICQ repository also depends on the affirmative choice of the person who saved the chat to play it back; therefore, in order to share the saved chat, the person must either be online, or must move the contents of the chat into a non-IM context such as email, web page, or text document. Another person can not actively open or search the chat unless the first person plays it back. Other applications, such as LOTUS SAMETIME, allow saving IM conversations as flat text. Both kinds of client applications place responsibility on the end users to save chat.

While the repositories described above allow full text search of the selectively logged chat, a number of needs arise that are not met. Server side repositories have at least three limitations. First the prior art repositories do not provide topic-based filtering by end users. Second, while chat transcripts may indeed be logged for the purpose of security and auditing, these repositories do not provide a commonly accessible, searchable repository. In other words, the prior art repositories are limited to full text online searches essentially by security personnel or senior management. Therefore, the knowledge generated or repeated in IM conversations isn't directly searchable or shareable across organizations. Chat clients aren't able to reference other chats and to recall them from a repository. Not all conversations are worth saving, but organizations should at least have the ability to choose whether to save all or some chats, or all or some chats on particular topics. Third, the prior art repositories do not allow filtering or searching on marked topics, nor do they log relevant metadata.

Client side repositories have at least three limitations. First, the end users are responsible for operations with the chat transcript, such as operations for cutting and pasting into email, for saving their chat transcripts, or for posting the transcripts to message boards. Leaving such actions up to each individual end user is an inconsistent process not subject to automation or to the application of business rules. Moreover, allowing users to control the save function, as well as to cut and paste the transcript, is an unreliable process that can also pose security risks due to unsupervised editing of the transcript. Second, personal saving of chats means the saved chats are not accessible among larger groups that might be interested in the content of the chat. Third, all chat participants do not have equal access to the chat history if the participants do not save the chat. Participants unfamiliar with previous conversations are often called into a new chat. Most chat applications do not provide search or filtering of a repository, or direct access to transcripts. Therefore, new participants must be given background and orientation to the topic at hand by second hand accounts (rather than the initial chat transcript). These additional messages take up time and resources.

The chat applications that do provide search or filtering of a repository have limitations. One method uses string-matching to provide search results. Yet the same string can occur within the context of many different topics. Second, known search methods do not filter based on a person's membership in a group, such as an organization, and so the abstract characteristics of who is speaking are not available as a filter. For example, a manager may want to see what people in his or her organization are chatting about, or the manager may want to search for a particular phrase within chats on a defined topic. Currently known methods do not allow for search and filtering of cross-reference among chats, even though many chat transcripts refer to previous conversations.

Therefore, a need arises for a system and method to store structured "chats" in a searchable repository on either or both of the client computer and the server computer. A need further arises for more precise searches through filtering by metadata, such as chat topic and user characteristics or by Lightweight Directory Access Protocol (LDAP) data such as organization, project, or membership. A need also exists for a system and method to auto-alert and/or to export to other formats such as e-mail or content management based upon the chat topics and/or participants. Moreover, a need arises to allow for retrospective application of topics to chat transcripts that have not been tagged for particular topics by end users. In this fashion, an organization may recover information in chat transcripts according to its own needs regardless of how end users have classified that information. Organizations may also automate the tagging of chats by topic if needed. Finally, a need exists for a system and method to allow managed decisions for security purposes to specify what chats will be saved and to provide for an automatic saving of specified chats or chats on specified topics.

SUMMARY OF THE INVENTION

The present invention, which meets the needs stated above, is a system and method for storing IM text in a repository where it can be searched by topic or participant based filters. The repository may be a centralized database on the server side or it may be distributed in the client environment. The system comprises an IM Topic (IMT) program, an IM Filter (IMF) program, an IM save program (IMS), and an IM automatic alert (IMAL) program. The IMT program assigns topic tags to turns and topic shifts in the IM conversation. The IMF program searches the repository based on user selection of filters as well as full text search. There may be any number of topic tags. The IMS program automatically scans IM transcripts for topic tags and identifiers and saves transcripts or transcript segments that match pre-selected topic tags or identifiers to the repository. The IMAL program sends notifications and/or exports transcripts or transcript segments to pre-designated addresses when a match is made between a topic or identifier in a transcript and a pre-selected topic or identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "chat" means communication by one person at a computer with another person at a remote computer using instant messaging (IM).

As used herein, the term "chat transcript" means the text of the data transmitted by a first participant and the text of the data transmitted by a second participant during a chat.

As used herein, the term "computer" shall mean a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, the term "identifier" shall mean any metadata indicating user characteristics and may further include, without limitation, Lightweight Directory Access Protocol (LDAP) data such as organization, project, or membership.

As used herein, the term "instant messaging" (IM) means a communication service that allows a user on one computer to send and receive text messages in real time with another user on a second computer connected to the first computer by the Internet.

As used herein, the term "subtopic" means a term used to further subdivide a topic and chat transcript or chat transcript segment.

As used herein, the term "topic" means a term or terms used to identify the subject of a chat transcript or of a chat transcript segment.

As used herein, the term "topic marker" means an identifier attached to a chat transcript segment as metadata.

As used herein, the term "turn" means a shift in textual communication during a chat indicated by successive statements.

As used herein, the term "topic shift" means a change from one topic or subtopic to another topic or subtopic in a chat where the change is indicated by selection of new topic or subtopic marker or by change to new topic input entry field and attachment of the new topic or subtopic marker to a chat transcript or chat transcript segment.

Figure 1:
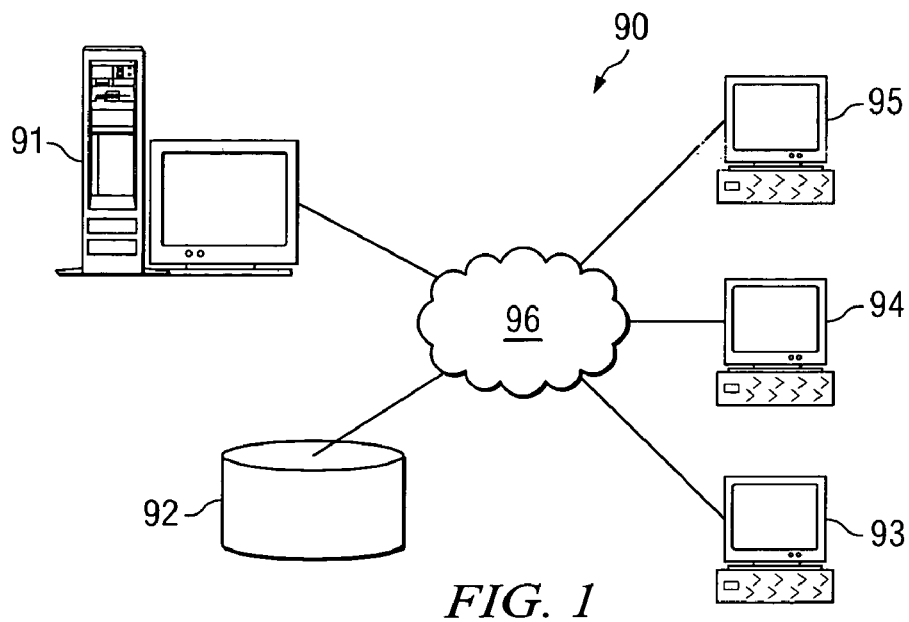
FIG. 1 is an illustration of a computer network used to implement the present invention.
Figure 2A:
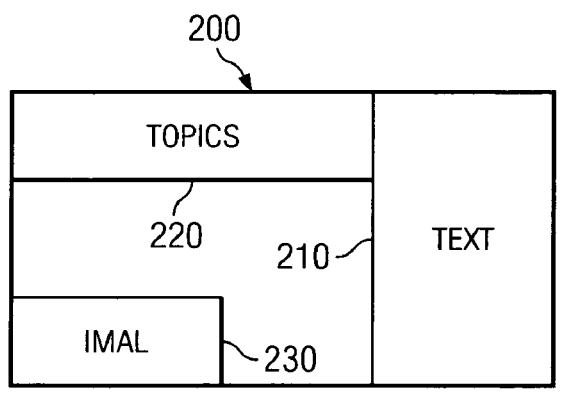
FIG. 2A is an illustration of a repository memory associated with the present invention.
Figure 2B:
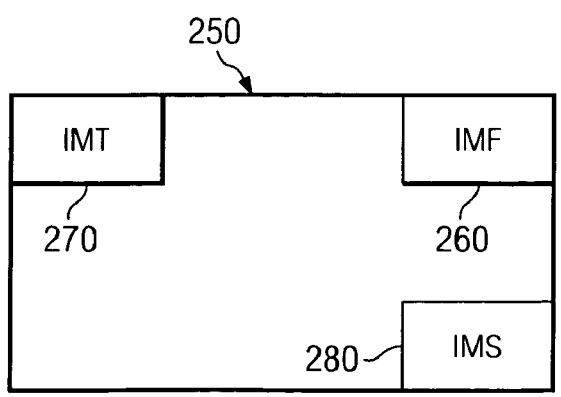
FIG. 2B is an illustration of a client memory associated with the present invention.
Figure 3A:
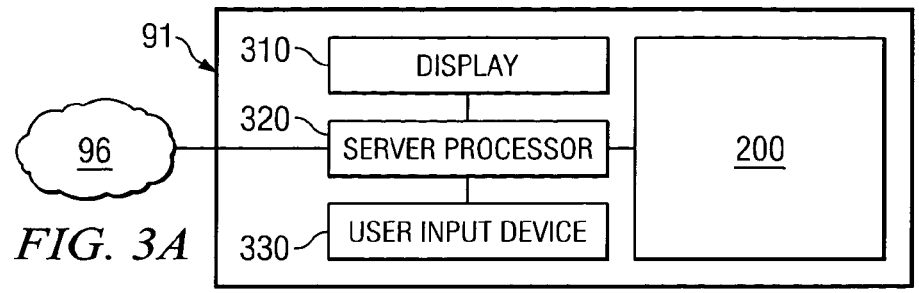
FIG. 3A is an illustration of a server computer associated with the present invention.
Figure 3B:
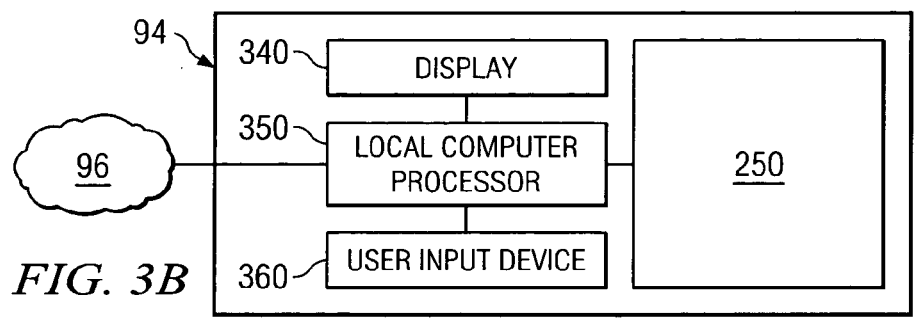
FIG. 3B is an illustration of a client computer associated with the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet or World Wide Web. Furthermore, computer network 90 depicted in FIG. 1 is intended as a representation of a possible operating network containing the present invention and is not meant as an architectural limitation.

The internal configuration of a computer, including connection and orientation of the processor, memory, and input/output devices, is well known in the art. The present invention is a methodology that can be embodied in a computer program. Referring to FIGS. 2A, 2B, 3A, and 3B, the methodology of the present invention is implemented by first memory 200, second memory 250, server computer 91 and local computer 94. First memory 200 contains topic file 220, text file 210 and IM auto alert (IMAL) program 230. Second memory 250 contains IM Topic program (IMT) 270, IM Filter program (IMF) 260 and IM auto save program (IMS) 280. First memory 200 may reside in server 91, database 92, or may be distributed in network 90 among one or more of server 91, local computer 94, or remote computers 93 and 95. Second memory 250 may reside in local computer 94 or server 91. Alternatively, first memory 200 may be combined with second memory 250. Further in the alternative, first memory 200 and second memory 250 may be distributed throughout network 96. First memory 200 is connected to network 96 by local computer processor 320. Second memory 250 is connected to network 96 by server processor 350 of server computer 91.

Figure 4:
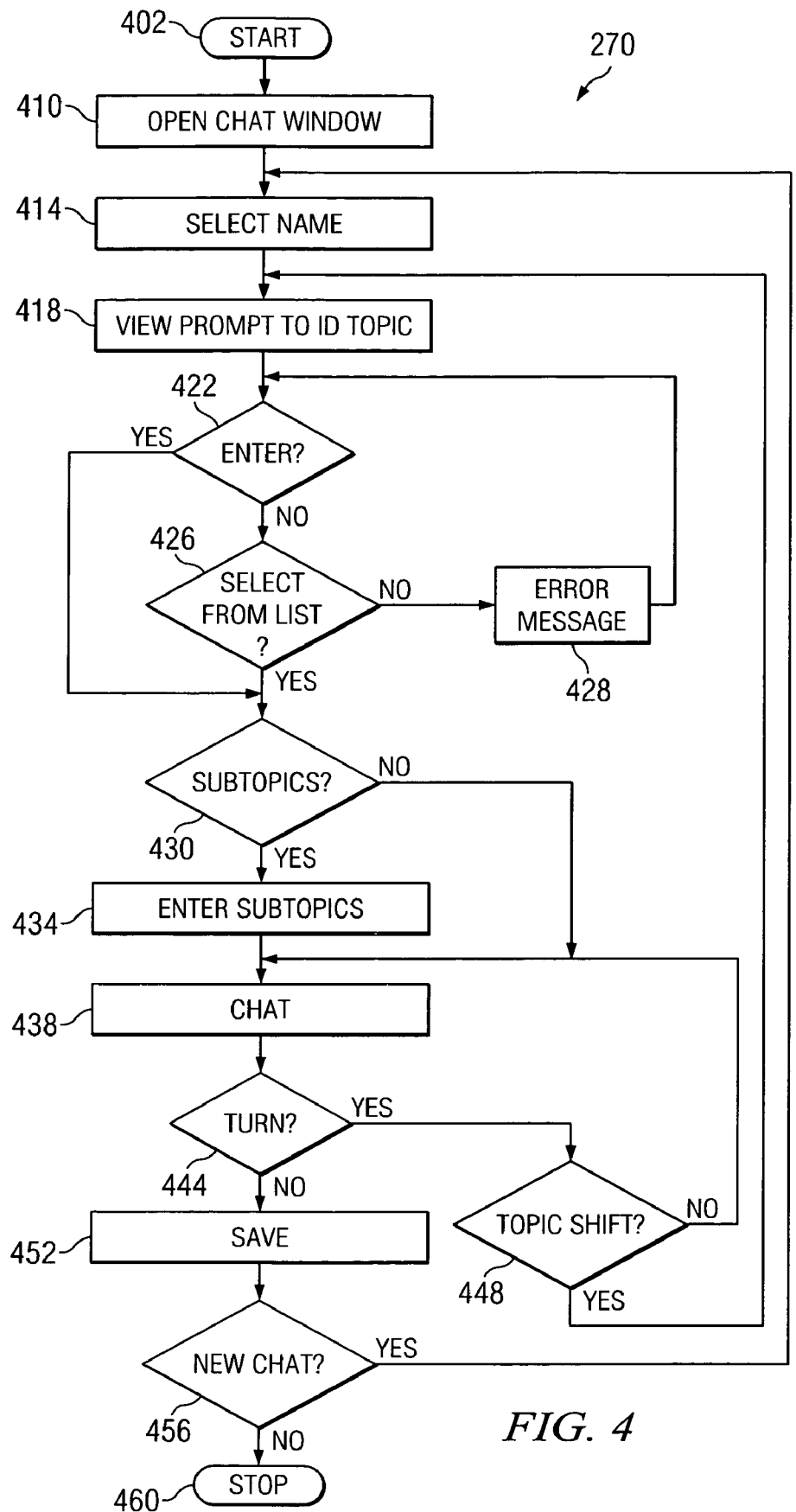
FIG. 4 is an illustration of the logic of the instant message tagging program associated with the present invention.

FIG. 4 shows the logic of IM Topic program (IMT) 270. IMT 270 begins (402) and opens chat window in local computer 91. The chat window displays the names of participants who are on-line and with whom a chat can be conducted. The user selects a name from the list (414). Selection can be accomplished by clicking on the name with user input device 360. A prompt is displayed allowing the user to identify the topic of the chat (418). In an alternative embodiment for an automated IMT (not shown), following step 414 of IMT 270, the user may be asked whether automatic topic tagging is desired. In the alternative embodiment, if the user elects automatic topic tagging, then automated IMT would proceed to step 438 of IMT 270 and the chat would begin. In the alternative embodiment, a variety of techniques familiar to persons skilled in the art would be used to select topics and/or subtopics from the chat text and to automatically insert the topic tags and subtopic tags when turns and topic shifts are identified. Returning to the embodiment of FIG. 4, IMT 270 continues and a determination is made whether the user has entered a topic (422). If not, a determination is made whether the user has selected from a list of available topics (426). If the user does not enter a topic (422), and if the user does not select a topic from the list (426), then an error message is displayed and the user is again asked to enter a topic (422). In an alternative embodiment (not shown), when a message is displayed at step 428 of IMT 270, the user may be presented with an option to apply topics and/or subtopics retrospectively. In the alternative embodiment, if the user elects to apply topics and/or subtopics retrospectively, then the user will be prompted to do so after completion of the chat (after step 444 and before step 452 of IMT 270 below). In the alternative embodiment, if the user elects to apply topics retrospectively, then the alternate embodiment will proceed to step 438 of IMT 270. In the alternative embodiment, upon completion of the chat, the user will be prompted to identify topics and/or subtopics, and upon entry of the topics and/or subtopics by the user, the alternate embodiment will automatically insert the topics and/or subtopic tags into the chat text. Returning to the embodiment of FIG. 4, if at step 422, the user entered a topic, or if at step 426, the user selected a topic from a list, then a determination is made as to whether the user wants to designate one or more subtopics (430). If so, the user enters the subtopic or subtopics (434) and the user begins the chat (438). IMT 270 monitors the chat and determines whether a turn has occurred in the chat (444). If not, the chat is saved 452 and IMT 270 goes to step 456. Chats are saved in a structured format such as XML to allow metadata for the topics and subtopics to be saved. The saved data is written to a database such as database 92 (See FIG. 1) and accessed via SQL or similar language. If a turn has occurred, a determination is made as to whether a topic shift has occurred (448). If a topic shift has not occurred, IMT 270 continues to monitor the chat (438). If a topic shift has occurred, IMT 270 goes to step 418 and repeats the process of either entering a topic or subtopic, or selecting a topic or subtopic. IMT 270 continues until a determination is made at step 444 that a turn has not occurred and the chat is saved. The determination of whether a turn has occurred can be based on a pre-designated factor such as the amount of textual data entered or a time period. After the chat is saved (452), a determination is made whether a new chat is to be conducted (456). If so, IMT 270 goes to step 414. If not, IMT 270 stops (460). IMT 270 can be implemented using VB, C++, Java or AWT/Swing. IMT 270 can be implemented as a plug-in to reduce the cost of a new IM program and/or making users download and install a new IM program.

Figure 5:
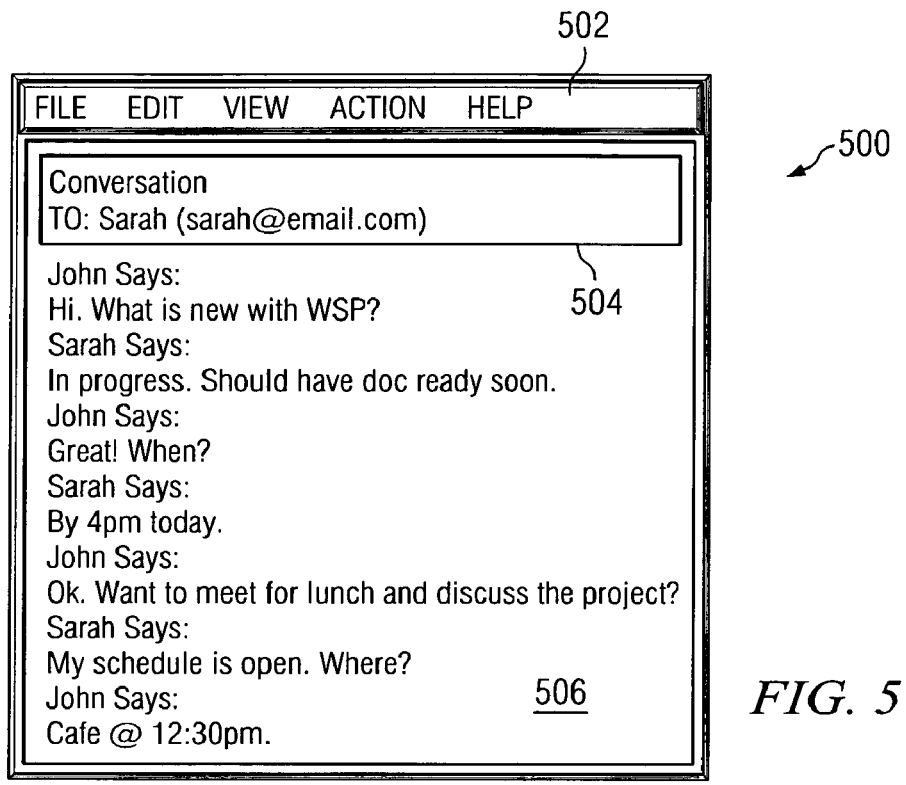
FIG. 5 is an illustration of an instant message display.

FIG. 5 depicts a chat window without the topic tag of IMT 270. Chat window 500 has utility section 502 from which the user can select actions such as file, edit, view, action or help. Chat identifier area 504 shows with whom the chat is being conducted. Chat transcript area 506 displays the conversation between the user and the selected chat participant.

Figure 6A:
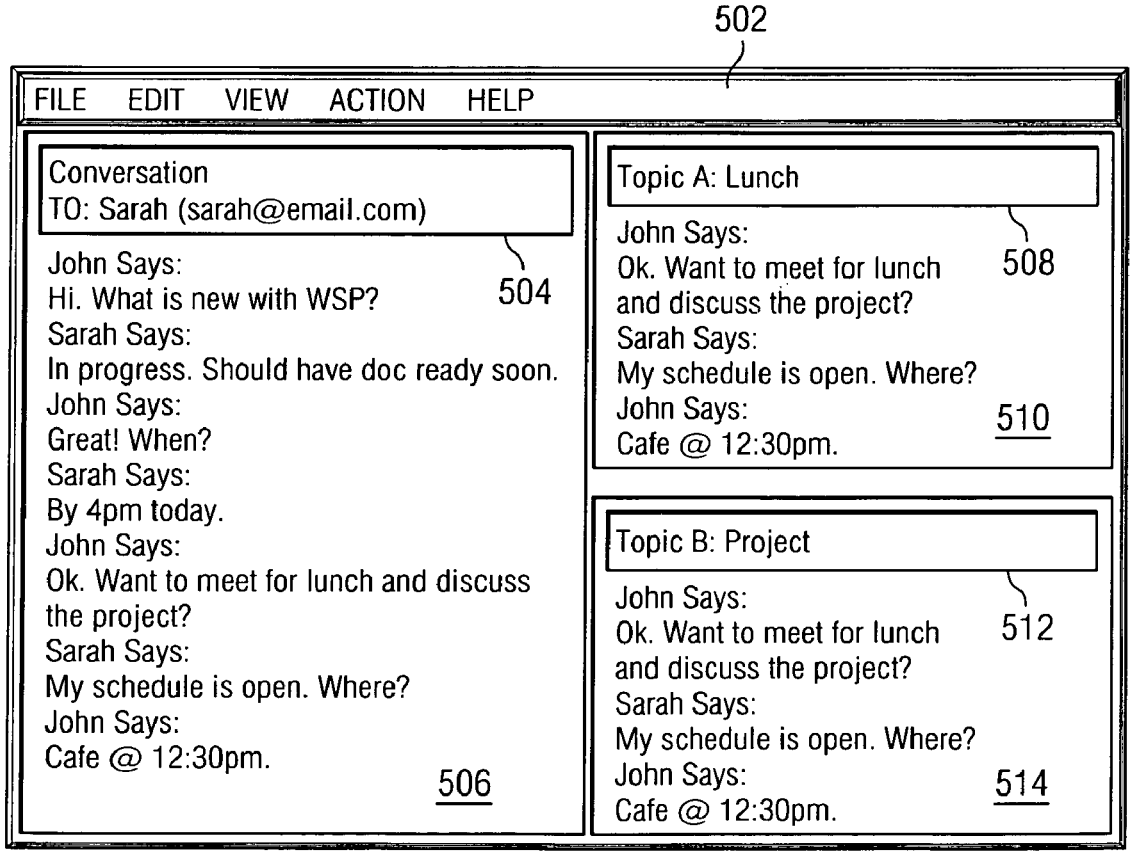
FIG. 6A is an illustration of an instant message display with two topic segments in vertical alignment with the instant message transcript.
Figure 6B:
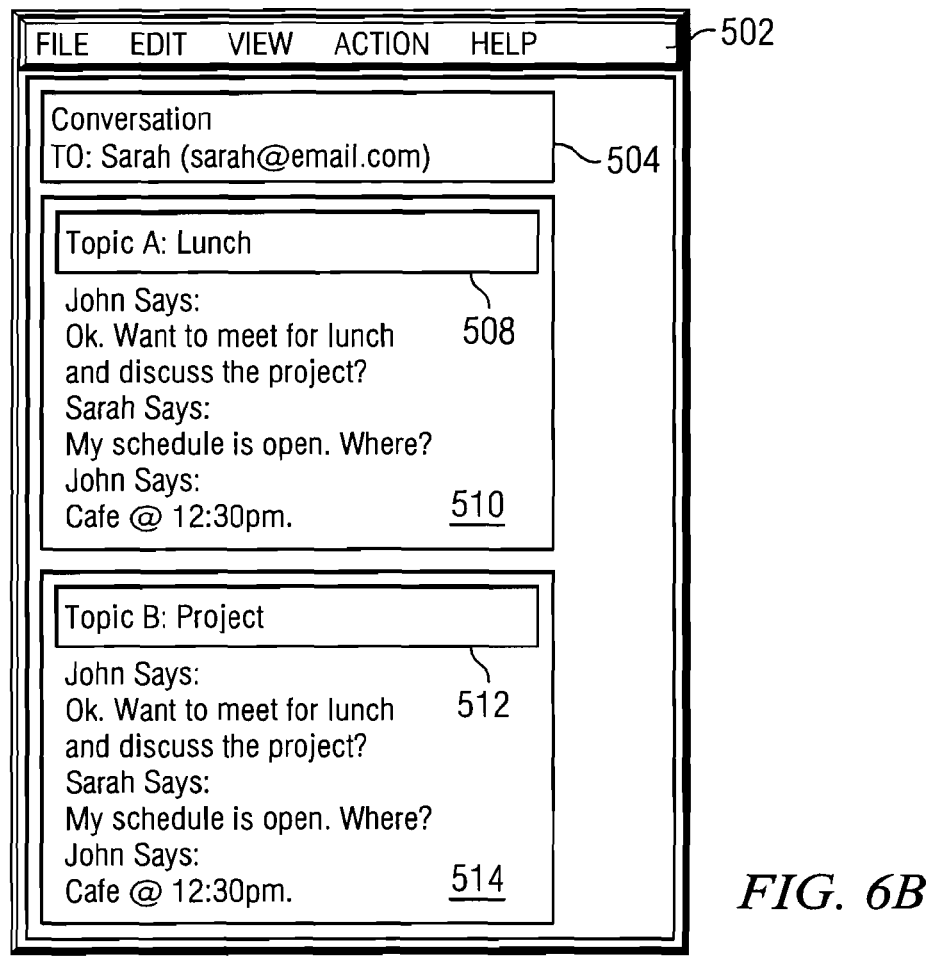
FIG. 6B is an illustration of an instant message display with two topic segments in vertical alignment without the instant message transcript.
Figure 6C:
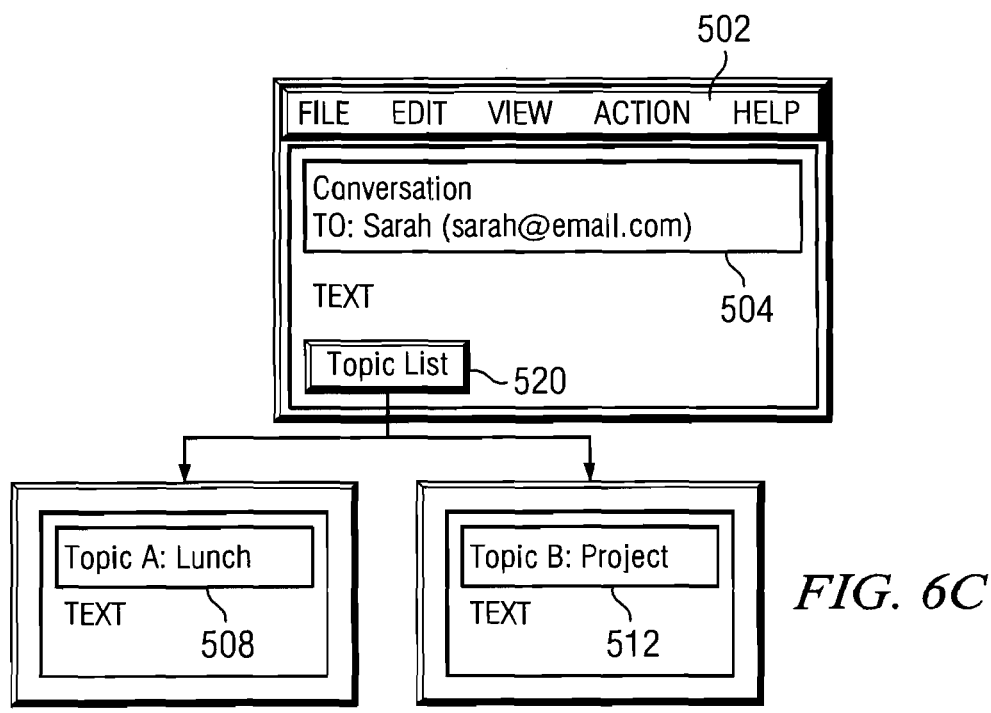
FIG. 6C is an illustration of an instant message display with a topic list link and two subtopic display headings.
Figure 6D:
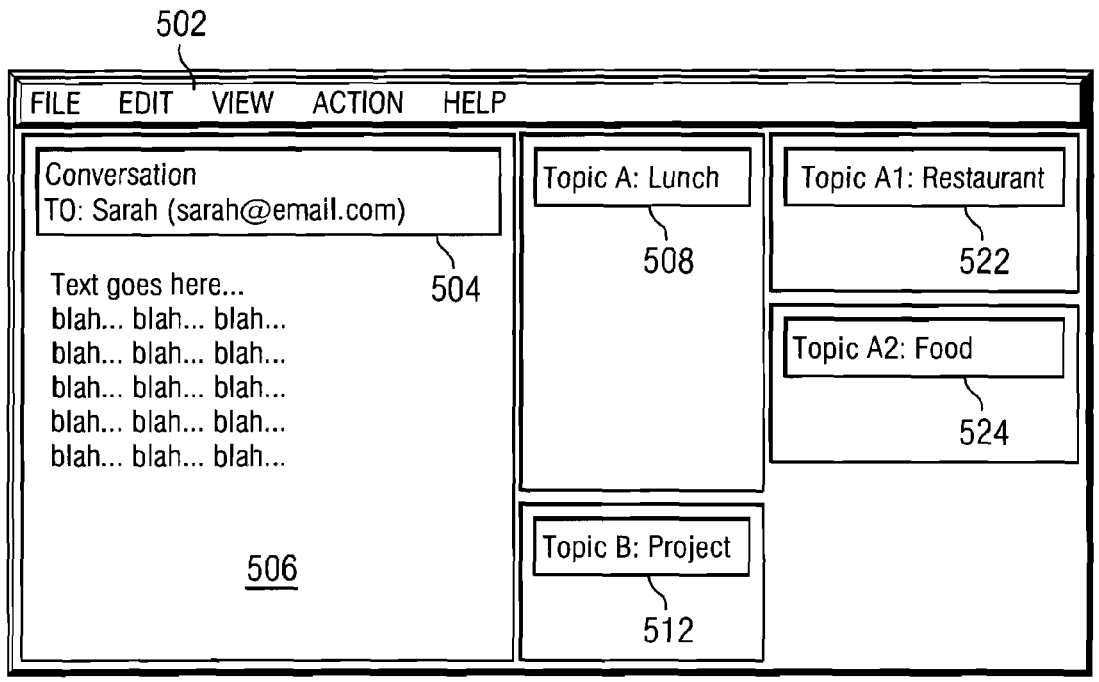
FIG. 6D is an illustration of an instant message display with topics, subtopics and cascading window implementation.
Figure 6E:
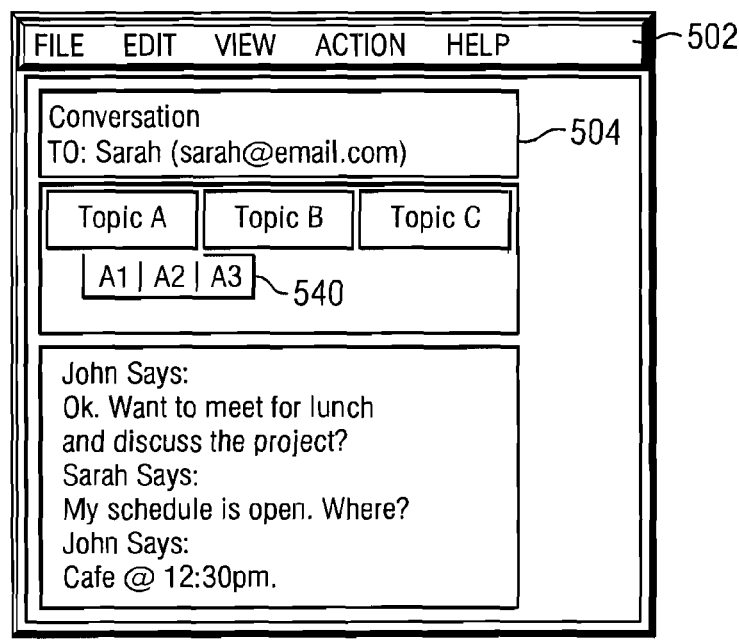
FIG. 6E is an illustration of an instant message display with topics and tabs for subtopic display.

FIG. 6A depicts a chat window employing topic tags. Next to chat transcript 506, a first transcript segment 510 for Topic A 508 and a second transcript segment 514 for Topic B 512 are displayed. FIG. 6B shows a variation with utility area 502, Chat identifier area 504, first transcript segment 510, and second transcript segment 514. FIG. 6C shows a variation with topic tag list 520 displayed at the end of the chat transcript. When topic tag list 520 is activated such as by clicking on one of the topics tags, the selected topic tag, such as topic A 508 or topic B 512, is displayed with the corresponding transcript segment. An additional variation is shown in FIG. 6D where topic A 508 is further divided according to subtopics A1 522 and A2 524. The division into subtopics can be extended to any number of levels of subtopics. FIG. 6E shows a method of displaying topics and subtopics in one area 540 above the chat transcript. In area 540 the subtopics are displayed as tabs in order to save space. The topics and tabs may be color coded and the subtopics may be in layers to maximize the use of space.

Figure 7:
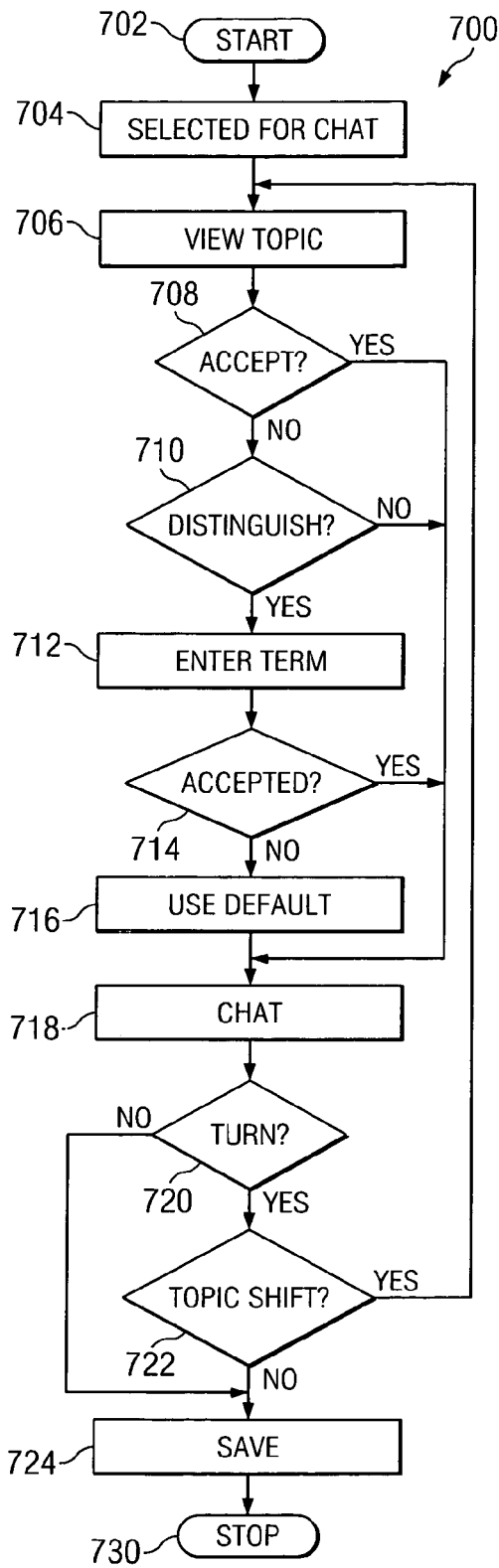
FIG. 7 is an illustration of the logic of the instant messaging topic tagging program.

FIG. 7 displays IMT 700 which is a variation on IMT 270 that may be implemented in conjunction with IMT 270 by the user who initiated the chat, or by a chat participant. IMT 700 starts (702) and a participant is selected for a chat (704). A topic tag for the chat is displayed (706). A determination is made as to whether the user wants to accept the topic tag (708). If so, the chat will begin (718). If not, a determination is made whether the user wants to distinguish the topic tag (710). If so, the user will enter a term for the topic tag (712). A determination is made whether the other chat member accepts the topic tag entered by the user (714). If not, a default topic tag is used (716), and the chat begins (718). If the user does not want to distinguish the topic tag, the chat will begin (718). A determination is made as to whether a turn has occurred (720). If not, the chat is saved (724). If so, a determination is made whether a topic shift has occurred (722). If not, the chat is saved (724). If a topic shift has occurred, IMT 700 goes to step 706. After the chat is saved, IMT 700 stops (730).

Figure 8:
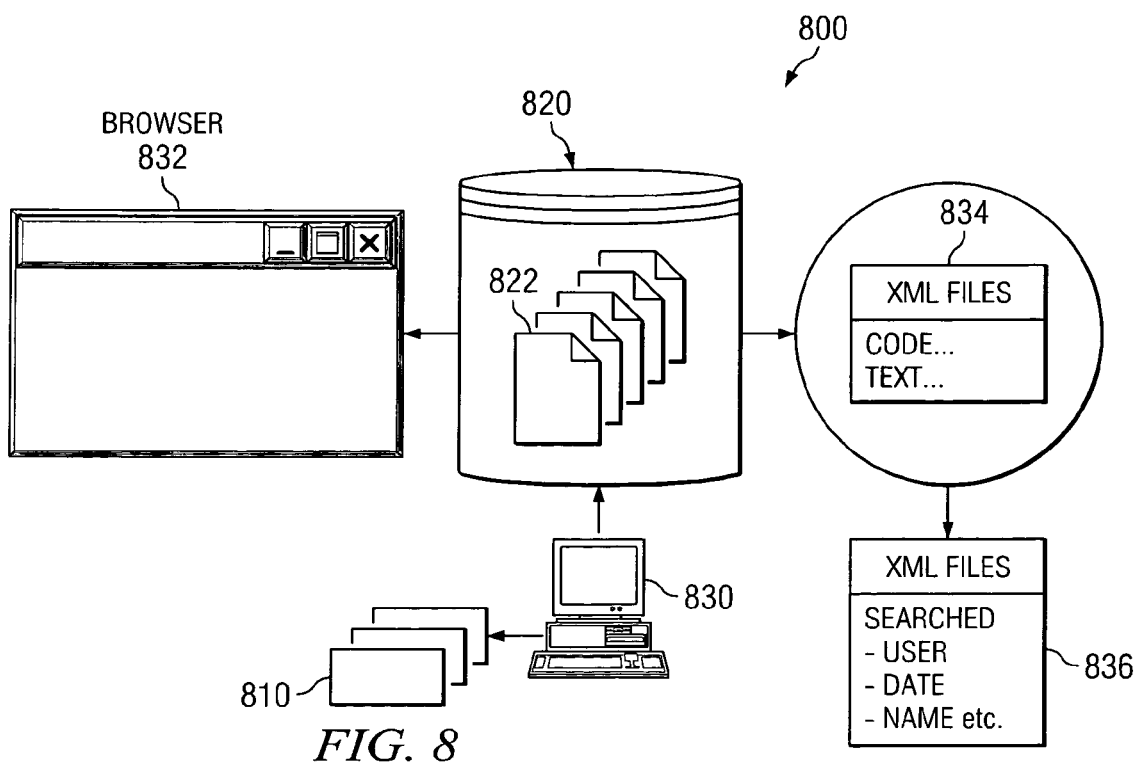
FIG. 8 is an illustration of a document repository with search capability.

FIG. 8 displays IM Repository system 800 having a search capability, an auto scan capability, and an auto alert capability. Chat transcripts 822 are deposited in repository 820. Chat transcripts are converted into XML files 834 so that they may be searched using various filters 836 such topic tags or identifiers such as user, date, name and so forth. Alternatively, chat transcripts 822 may be displayed and searched using a browser such as browser 832. Computer 832 may employ an automatic save program to save chat transcripts to the IM repository. Computer 832 may also employ an auto alert program to identify chat transcripts according to pre-selected criteria and send emails 810 to notify various addresses when the auto alert program identifies matches between topics or identifiers in the repository and topics or identifiers in an auto alert topic table. At the same time, or alternatively, the auto alert program can export the transcript or transcript segment to another format such as e-mail.

Figure 9:
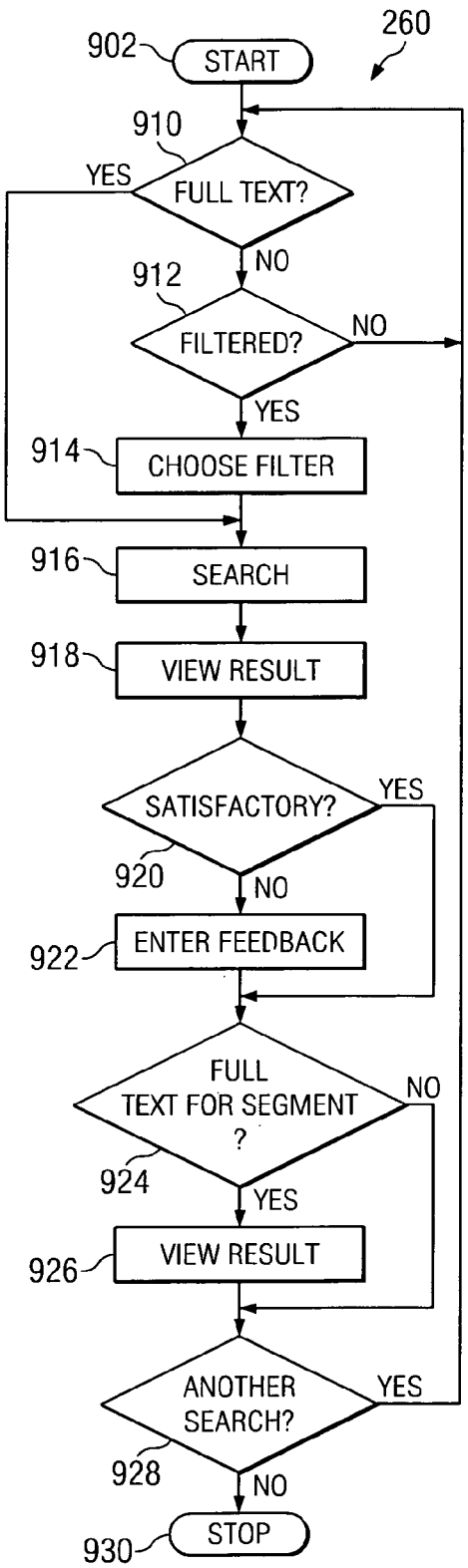
FIG. 9 is an illustration of an instant messaging repository search program.

FIG. 9 displays the logic of IM filter (IMF) program 260. IMF program 260 starts (902) and a determination is made whether a full text search is to be made (910). If so, a search is conducted (916). If not, a determination is made as to whether a filtered search is to be conducted (912). If not, IMF 270 returns to step 910. If so, a filter is chosen (914). The search is conducted (916). The search results are viewed (918). A determination is made whether the search was satisfactory (920). If not, the user enters feedback (922). If so, a determination is made whether the user wants to view the full text for the topic found (924). If so, the full text for the segment corresponding to the topic found is displayed (926). If not, or after viewing the transcript for the search result, a determination is made as to whether another search is to be conducted (928). If so, IMF 270 goes to step 910. If not, IMF 270 stops (930). Searches may be client based, web application based, or may be accomplished with VB, Java, Swing, or other such languages.

Figure 10:
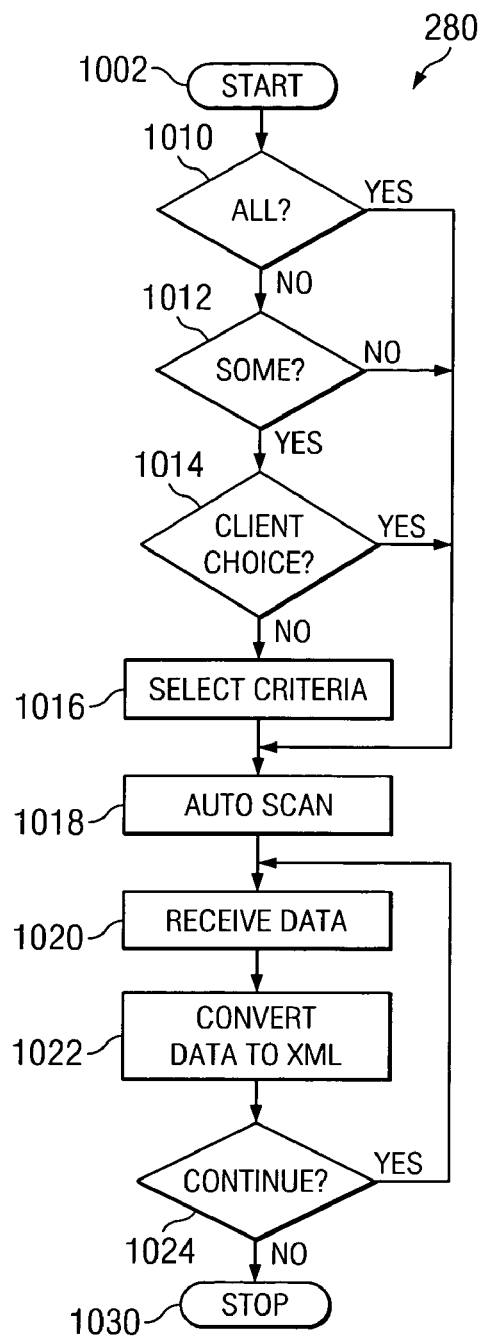
FIG. 10 is an illustration of an instant message repository system configuration program.

FIG. 10 shows the logic of the IM save program (IMS) 280. IMS 280 begins and a determination is made as to whether all chat transcripts are to be saved (1010). If so, IMS goes to step 1018. If not, a determination is made as to whether some chat transcripts are to be saved (1012). If so, a determination is made whether client choice will be allowed (1014). If not, the criteria that will be used to select transcripts to be saved is selected (1016). If client choice is to be allowed, then IMS 280 goes to step 1018 and transcripts are scanned. Data is received according to the selection criteria (all or some) from the scanned transcripts (1020). The received data is converted into XML format (1022). A determination is made whether IMS is to continue (1024). If so, IMS 280 goes to step 1020. If not, IMS 280 stops (1030).

Figure 11:
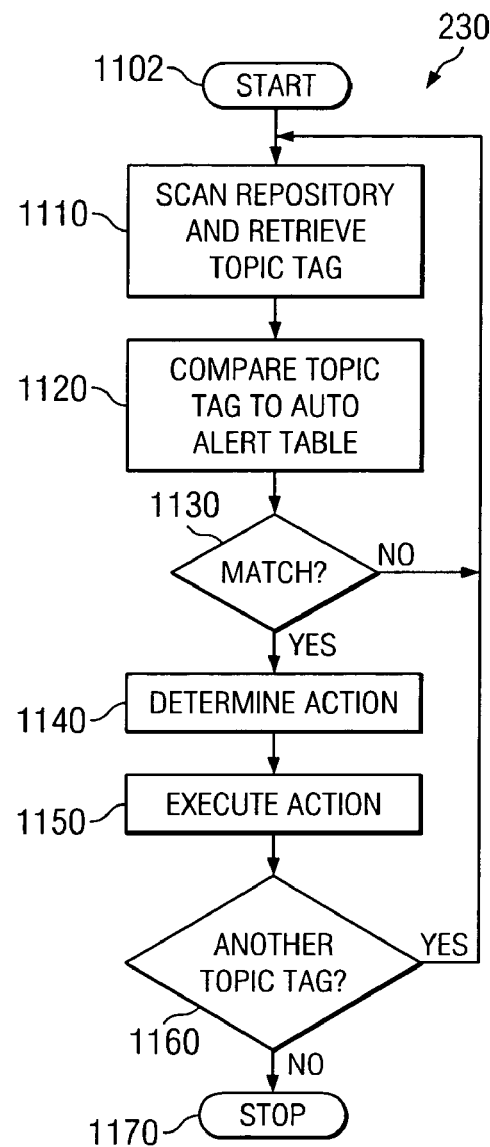
FIG. 11 is an illustration of an instant message repository auto save program.

FIG. 11 shows the logic of auto alert program IMAL 230 that may be run in conjunction with IMS 280. IMAL 230, starts (1102) and scans and receives topic tags from scanned transcripts (1110). The topic tag is compared to an auto alert table (1120). A determination is made as to whether a match has been made (1130). If not, IMAL goes to step 1110. If so, IMAL determines the action to be taken that is associated with the topic in the auto alert table (1140). IMAL executes the action (1150). A determination is made whether there is another topic tag (1160). If so, IMAL 230 goes to step 1110. If not, IMAL 230 stops (1170).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method comprising:

responsive to a first input to a computer by a first user of an instant messaging service configured for sending and receiving a plurality of text messages in real time between the first user and a second user, determining, by a processor of the computer based only on the first input, that a topic tag is to be inserted into a text message of an instant messaging session, wherein the instant messaging service is configured to accept the first input before the instant messaging session begins, during the instant messaging session, and after the instant messaging session;

responsive to a second input to the computer by the second user, determining by the processor, one of a first acceptance and a rejection of the topic tag by the second user;

responsive to the first acceptance, automatically inserting the topic tag, by the processor, into the text of the instant messaging session when a turn is identified by the processor, wherein a turn means a shift in a textual communication during the instant messaging session indicated by a plurality of successive statements;

responsive to the rejection, continuing the instant messaging session without an insertion of the topic tag;

responsive to a third input to the computer by the first user, determining by the processor of the computer that a sub-topic tag is to be inserted into a segment of the text corresponding to the sub-topic, wherein the instant messaging service is configured to accept the third input before the instant messaging session begins, during the instant messaging session, and after the instant messaging session;

responsive to a fourth input to the computer, determining by the processor, a second acceptance of the sub-topic tag by the second user;

responsive to the second acceptance, automatically placing the sub-topic tag, by the processor, into the segment of the text when a change from a topic shift occurs in the instant messaging session;

displaying a graphical user interface that has a first area for displaying the chat transcript of the instant messaging session and that displays a topic list at an end of the chat transcript, a first sub-topic tab, and a second sub-topic tab; and wherein upon activation of a selected topic in the topic list, the selected topic is displayed with a first corresponding transcript segment in a second area of the graphical user interface, upon activation of the first sub-topic tab, the first sub-topic is displayed with a second corresponding transcript segment in a third area of the graphical user interface, and upon activation of the second sub-topic tab, the second sub-topic is displayed with a third corresponding transcript segment in a fourth area of the graphical user interface.

2. The method of claim 1 further comprising:

saving a transcript of the instant messaging session to a repository;

searching the repository for the topic tag; and responsive to determining that there is a match between the topic tag in the repository and an entry in an auto alert table, exporting an associated transcript segment to an e-mail.

3. A system comprising:

a computer connected to a plurality of remote computers and to an instant messaging service by a network, the instant messaging service configured for sending and receiving a plurality of text messages in real time between a plurality of users on the plurality of remote computers;

a computer readable memory and a non-transitory computer readable storage medium;

first program instructions for determining, responsive to a first input to the computer by a first user, that a topic tag is to be inserted into a text message of an instant messaging session, wherein the instant messaging service is configured to accept the first input before the instant messaging session begins, during the instant messaging session, and after the instant messaging session;

second program instructions for determining, responsive to a second input to the computer by the second user, an acceptance of the topic tag by the second user;

third program instructions for automatically inserting, responsive to the acceptance, the topic tag into the text of the instant messaging session when a turn is identified, wherein a turn means a shift in a textual communication during the instant messaging session indicated by a plurality of successive statements;

fourth program instructions for determining, responsive to a third input to the computer by the first user, that a sub-topic tag is to be inserted into a segment of the text, wherein the instant messaging service is configured to accept the third input before the instant messaging session begins, during the instant messaging session, and after the instant messaging session;

fifth program instructions for determining, responsive to a fourth input to the computer, an acceptance of the sub-topic tag by the second user;

sixth program instructions for automatically placing, responsive to the acceptance, the sub-topic tag into the segment of the text when a topic shift occurs in the instant messaging session;

seventh program instructions for displaying a graphical user interface that has a first area for displaying the chat transcript of the instant messaging session and that displays a topic list at an end of the chat transcript, a first sub-topic tab, and a second sub-topic tab; and eighth program instructions for displaying, responsive to activation of a topic in the topic list, the topic with a first corresponding transcript segment in a second area of the graphical user interface, responsive to activation of the first sub-topic tab, displaying the first sub-topic with a second corresponding transcript segment in a third area of the graphical user interface, and responsive to activation of the second sub-topic tab, displaying the second sub-topic with a third corresponding transcript segment in a fourth area of the graphical user interface;

wherein the first through the eighth program instructions are stored in the non-transitory computer readable storage medium for running by a processor of the computer via the computer readable memory.

4. The system of claim 3 further comprising:

ninth program instructions for saving a transcript of the instant messaging session to a repository;

tenth program instructions for searching the repository for the topic tag; and eleventh program instructions for exporting, responsive to determining that there is a match between the topic tag in the repository and an entry in an auto alert table, an associated transcript segment to an e-mail;

wherein the ninth, tenth, and eleventh program instructions are stored in the non-transitory computer readable storage medium for running by a processor of the computer via the computer readable memory.

5. A computer program product comprising:

a non-transitory computer readable storage medium;

first program instructions to connect a computer to a plurality of remote computers and to an instant messaging service by a network, wherein the instant messaging service is configured for sending and receiving a plurality of text messages in real time between a plurality of users on the plurality of remote computers;

second program instructions for determining, responsive to a first input to the computer by a first user, that a topic tag is to be inserted into a text message of an instant messaging session, wherein the instant messaging service is configured to accept the first input before the instant messaging session begins, during the instant messaging session, and after the instant messaging session;

third program instructions for determining, responsive to a second input to the computer by the second user, an acceptance of the topic tag by the second user;

fourth program instructions for automatically inserting, responsive to the acceptance, the topic tag into the text of the instant messaging session when a turn is identified, wherein a turn means a shift in a textual communication during the instant messaging session indicated by a plurality of successive statements;

fifth program instructions for determining, responsive to a third input to the computer by the first user, that a sub-topic tag is to be inserted into a segment of the text, wherein the instant messaging service is configured to accept the third input before the instant messaging session begins, during the instant messaging session, and after the instant messaging session;

sixth program instructions for determining, responsive to a fourth input to the computer, an acceptance of the sub-topic tag by the second user;

seventh program instructions for automatically placing, responsive to the acceptance, the sub-topic tag into the segment of the text when a topic shift occurs in the instant messaging session;

eighth program instructions for displaying a graphical user interface that has a first area for displaying the chat transcript of the instant messaging session and that displays a topic list at an end of the chat transcript, a first sub-topic tab, and a second sub-topic tab; and ninth program instructions for displaying, responsive to activation of a topic in the topic list, the topic with a first corresponding transcript segment in a second area of the graphical user interface, responsive to activation of the first sub-topic tab, displaying the first sub-topic with a second corresponding transcript segment in a third area of the graphical user interface, and responsive to activation of the second sub-topic tab, displaying the second sub-topic with a third corresponding transcript segment in a fourth area of the graphical user interface;

wherein the first through the ninth program instructions are stored in the non-transitory computer readable storage medium.

6. The computer program product of claim 5 further comprising:

tenth program instructions for saving a transcript of the instant messaging session to a repository;

eleventh program instructions for searching the repository for the topic tag; and twelfth program instructions for exporting, responsive to determining that there is a match between the topic tag in the repository and an entry in an auto alert table, an associated transcript segment to an e-mail;

wherein the tenth, eleventh, and twelfth program instructions are stored in the non-transitory computer readable medium.

* * * * *